United States Patent Office 3,798,263
Patented Mar. 19, 1974

3,798,263
PROCESS FOR MAKING DL-S-BENZYL-N-ACETYL CYSTEINE
Paul Rambacher, Stettinerstrasse 4, Rosenheim, Germany, and Siegfried Make, Kufsteiner Strasse 85, Kirchdorf am Inn, Germany
No Drawing. Filed June 10, 1969, Ser. No. 831,987
Claims priority, application Germany, June 11, 1968, P 17 68 647.4; July 29, 1968, P 17 93 094.8
Int. Cl. C07c 149/42
U.S. Cl. 260—516     1 Claim

ABSTRACT OF THE DISCLOSURE

The application discloses a process for making racemic cysteine, inactive cystine and DL - S - benzyl-N-acetyl cysteine by reacting serine and acetic anhydride in the presence of a thioacid, such as thioacetic acid, or in the presence of thiourea, whereby the thio-compound is attached to the azlactone of acetamino acrylic acid in statu nascendi. The attachment product is then hydrolyzed by an alkaline or acid hydrolyzing agent, or by both successively, thereby forming racemic cysteine. This product may be used as such, or it may be oxidized to form inactive cystine, or it may be benzylated and acetylated to form DL-S-benzyl-N-acetyl-cysteine.

Field of the invention

The present invention relates to a process for making cystine, and more in particular is concerned with a process for making cystine, wherein racemic cysteine is formed, which may be used as such, or which may be oxidized to form the inactive cystine, or which may be benzylated and acetylated to form DL-S-benzyl-N-acetyl cysteine.

Background of the invention

Cysteine is a naturally occuring amino acid which has also been known to be produced synthetically. Earlier methods of preparation were based on the reaction of serine-methyl-ester hydrochloride or benzylthiomethylchloride with sodium-phthalimidomalonic ester. These methods are complicated, uneconomical and inefficient. More recently, more elegant methods of preparation have been proposed wherein a thioacid is attached to acetamino acrylic acid. These processes are not susceptible to economical and efficient production on an industrial scale as the starting materials are not readily available at reasonable cost in the required large quantities.

It has also been proposed to produce synthetic cystine via a reductive ring opening of 2-amino-DL-thiazolidene-4-carboxylic acid, which may be obtained by attaching thiourea to an α-chloro-acylic acid. This process suffers from the same disadvantage as the preceding process and, in addition does not yield the isolated cystine with the desired degree of purity, as the reaction product contains large amounts of neutral salts not easily and readily separable from the cystine yield.

Summary of the invention

Having in mind these problems, difficulties and disadvantages, it is an object of our invention to provide a process for making racemic cysteine, inactive cystine, and DL-S-benzyl-N-acetyl cysteine which is simple, efficient and economical and susceptible to industrial production on a large scale.

A further object of our invention is to provide such a process, which may proceed from readily available starting materials even in large quantities.

A further object of our invention is to provide a process for making the products mentioned, wherein the cystine product may be readily and easily separated from the reaction products, and having a high degree of purity.

In attempting to accomplish these objects, we initially tried to obtain in a simple manner the starting material of acetaminoacrylic acid or its azlactone by splitting off water of serine or acetyl serine being reacted with acetic anhydride.

This method, however, did not succeed, probably because a methylene compound is formed during the reaction which is polymerized and thus no longer useful as a basis for the complete reaction in order to produce cystine. We then discovered that a highly efficient and useful synthesis of cysteine and cystine may be accomplished by providing for the reaction to occur in the presence of a thioacid, such as, for example, thioacetic acid which is attached to the methylene compound in statu nascendi. We have also discovered that a successful synthesis may also be obtained by carrying out the reaction in the presence of thiourea, which is attached in a similar manner, forming an acetylated iso-thiourea. We have furthermore found that in both instances the presence of acetic anhydride is critical and is required for the successful reaction to occur.

If a thioacid is used for practicing our invention, the reaction of serine, acetic anhydride and the thioacid, such as thioacetic acid, once it is completed, is followed by a hydrolyzing step of the attachment product of the reaction, in particular the step of hydrolyzing with an acid, thereby forming racemic cysteine, and then oxidizing the latter such as by adding hydrogen peroxide, while adjusting, for example, to a pH of 4–5, whereby inactive cystine is precipitated in the form of almost colorless fine needles, or, more frequently, as spherically shaped agglomeration of such needles. Yields from 70–80% of theoretical are readily attainable.

If thiourea is used during the initial reaction of serine and acetic anhydride, the hydrolysis is preferably carried in two steps, consisting of a first alkaline hydrolysis, such as an ammonia treatment, and then hydrolyzing with an acid, whereby the amide of acetyl cysteine is formed as an intermediates product, and then oxidizing as described with respect to the employment of a thioacid, thereby also obtaining the afore-described advantageous high yield of a substantially pure cystine.

In addition to many well known usages of substantially pure cystine, this inactive cystine may be employed for the preparation of unnatural D-forms which are assuming an increasing importance in view of their many applications well known to the person skilled in the art.

The cystine may be reduced to obtain cysteine, which in turn may be benzylated and acetylated in order to produce DL-S-benzyl-N-acetyl cysteine, but, according to a preferred embodiment of our invention we utilize the racemic cysteine obtained as an intermediate product during our process of synthetizing inactive cystine, by omitting the final oxidizing step and benzylating and acetylating the cysteine, thereby obtaining a solution of DL-S-benzyl-N-acetyl-cysteine, from which this product may readily be precipitated, such as by acidification of the reaction solution.

In addition to these broad and essential aspects of our process, further advantageous details, which are, however, not to be considered as limiting the scope of the invention beyond that of the appended claims, will become apparent upon the following description of the invention by way of a number of illustrative examples.

Detailed description

EXAMPLE 1

Reaction of DL-serine with thioacetic acid and acetic anhydride (A) 21 grams of DL-serine are suspended in 50 milliliters of acetic anhydride and 15.2 grams of thioacetic acid, to which are added a few drops of pyridine. During this addition, the temperature rises from 35–40° C. The suspension is agitated for two hours and then is heated to 100° C. The resulting reaction is exothermic and the temperature rises further to 122–125° C. During refluxing the acetic anhydride and the formed glacial acetic acid are brought to a boil and after a short while a complete solution is obtained, having a reddish-yellow color. The solution is maintained at a temperature of 120–125° C. for about 15 min., then is allowed to cool and poured over a bed of ice. Concentrated hydrochloric acid is added in an amount sufficient to form a 20% solution of hydrochloric acid, which is refluxed for 1 hour, settled with an active coal filter and evaporated under vacuum until a slurry is formed having the consistence of syrup. This syrup is absorbed in about 200 milliliters of water, treated with a concentrated aqueous solution of ammonia until it becomes slightly ammoniacal and then is gradually oxidized with a 3% solution of hydrogen peroxide, while now and then small amounts of ice are being added, until a negative reaction with respect to SH-groups is obtained with sodium nitroprusside. During this reaction at least some cystine is precipitated having a shape of fine needles, most of which form spherically shaped agglomerations. This precipitation is completed by adjusting to a pH of 4.5 and allowing to stand overnight. The product is then filtered and washed with water and acetone. The product is slightly colored but substantially pure. The yield is 14.9 grams, which is 62% of theoretical.

(B) A suspension is prepared containing 315 grams DL-serine in 240 grams of thioacetic acid and 1 liter of acetic anhydride. 5 milliliters pyridine are added to this suspension. Within 30 minutes the temperature of the suspension rises from room temperature to 45° C., and it is then further heated to 75° C. As soon as this temperature has been reached an exothermic reaction occurs tending to further raise the temperature, but the suspension is cooled from time to time to maintain a constant temperature of 80° C. After ½ hour all suspended matter has been dissolved and the solution is agitated for an additional 4 hours while keeping the temperature at 80° C. The solution has a honey-yellow colored appearance and is further processed as described in the preceding Example 1–A, with the modification that the oxidation is obtained by adding 100–110 milliliters of a 35% hydrogen peroxide solution. Furthermore, the precipitation of cystine is completed by adding an amount of acetone sufficient to produce a 30% solution of acetone. The product solution is allowed to stand overnight. A yield is obtained of 260–280 grams of spherical shaped crystals of inactive cystine having an almost pure white color. This amounts to 72–78% of the theoretical yield.

(C) 42 grams of DL-serine and 31 grams of thioacetic acid and 150 milliliters acetic anhydride are reacted by proceeding as described in Example 1–B, thereby obtaining a reaction solution having a honey-yellow color, from which the acetic acid content is separated by distillation under vacuum, leaving a residue having a thick, syrupy consistence. This residue is then absorbed with 100 milliliters of water, and the resulting solution is added to 800 milliliters of a concentrated, aqueous solution of ammonia having a temperature of 0° C. The solution is allowed to stand for 2 hours and is then measured for its content of SH-groups by potentiometric titration with mercury-II-chloride in 0.1 mole of a phosphate buffer at a pH of 4.5. 0.39 mole of SH-groups were found, indicating a yield of 97.5% of theoretical. By thin layer chromatographic analysis using silica gel of the type commercially available as F 254 silica gel from the firm Merck in Darmstadt, Germany, and a fluxing mixture of butanole, glacial acetic acid and water in a relative proportion of 4:1:1, the solution was found to contain N-acetyl-DL-cysteine.

The reaction solution is now divided into two equal portions. The first portion is oxidized by adding about 21 milliliters of a 35% hydrogen peroxide solution until the SH-reaction is negative. The solution is allowed to stand for several days (e.g. about 4–6 days) in a refrigerator without showing any indication of crystal formation of the amide of diacetylcystine. The solution is removed and evaporated under vacuum until it has a thick, syrupy consistency. The syrup is absorbed in about 500 milliliters of an 80% hydrochloric acid solution and refluxed and boiled for a period of about 2 hours. The dark solution is further evaporated under vacuum and the residue is absorbed in a sufficient amount of water and adjusted to a pH of 4.5 by adding sodium acetate. A product yield is obtained of 11.6 grams of slightly brownish, spherically shaped crystals of inactive cystine.

The second portion of the solution is heated under vacuum until all ammonia has been removed, dissolved in water, and oxidized with about 22 milliliters of a 35% hydrogen peroxide solution until the SH-reaction is negative. There is no precipitation of cystine. In order to produce such precipitation, the solution is hydrolyzed with a 20% hydrochloric acid solution producing a solution of a dark brown color, evaporated and reabsorbed in water and adjusted to a pH of 4.5 as described previously. The precipitated crystals of inactive cystine have a brown color and a spherical shape. The yield is 12.2 grams.

EXAMPLE 2

Reaction of L-serine with thioacetic acid and acetic anhydride 21 grams of L-serine are reacted with 15.7 grams of thioacetic acid and acetic anhydride and are processed as described in the Example 1–B, thereby obtained spherically shaped crystals of 19 grams of raw cystine. The product is tested for optical activity by dissolving the crystals in 2 n-hydrochloric acid and passing a beam of polarized light through the solution. It is found that the plane of polarization is not rotated.

EXAMPLE 3

(A) Preparation of the azlactone of N-acetyl-S-(β-carboxy-β-acetamino)-ethylisothiourea 5

(a) From acetamino acrylic acid 4 and thiourea: 10 grams of acetamino acrylic acid 4 and 5.9 grams of thiourea are added to a mixture of 20 milliliters of glacial acetic acid and 15 milliliters acetic anhydride. A few drops of pyridine are added, and the solution is heated to a temperature of 80–90° C. There is some immediate precipitation of needle-shaped crystals and after about 3 hours the precipitation is complete, yielding 11.4 grams=72% of theoretical of the azlactone 5.

(b) From serine 7 and thiourea: 106 grams (1 mole) of DL-serine and 76.5 grams thiourea are suspended in 500 milliliters of acetic anhydride. A few drops of pyridine are added and the solution is heated to 75° C., whereupon an exothermic reaction sets in. The solution is maintained at a constant temperature of 80° C. for about 3 hours, and there is some immediate precipitation of needle shaped crystals of the azlactone 5. After diluting with water, separating the precipitated crystals and washing the same with water and acetone a yield of 76.5 grams of the azlactone is obtained.

(c) From α,α-diacetamino acid 9 and thiourea: 9.5 grams of α,α-diacetamino propionic acid and 3.8 grams of thiourea are dissolved in 20 milliliters of glacial acetic acid and 15 milliliters of acetic anhydride. A few drops of pyridine are added and the solution is heated to 110–120° C. for about 10 minutes. The solution is then allowed to stand and is stirred from time to time with a glass rod until there is a precipitation of agglomerated bundles of needle-shaped crystals. After diluting with 100 milliliters of water the crystals are separated and washed with water and acetone, yielding 2.9 grams of the azlactone. The azlactone is insoluble in cold water and sparingly soluble in conventional organic solvents and although soluble in concentrated hydrochloric acid it cannot be separated therefrom by neutralization. It is rather slowly soluble in a concentrated aqueous solution of ammonia. The solution shows a strongly positive SH-reaction.

(B) Preparation of N,N'-diacetylcystinediamide 8 from the afore-described azlactone 5

36.5 grams of the azlactone 5 and 350 milliliters of a concentrated aqueous solution of ammonia are poured into an open topped container and stirred until all crystals have been dissolved. The solution is allowed to stand for about 3 days, during which period there is a precipitation of agglomerated bundles of small flakes. The precipitate is removed and washed in water and acetone. The flakes are substantially insoluble in any water, acetone, alcohol and the conventional organic solvents. The yield of 12.8 grams can be augmented by another 1.5 grams by oxidizing the native solution with hydrogen peroxide until the SH-reaction becomes negative. After washing and cleaning the raw product, 5 grams thereof are dissolved in 25 milliliters of concentrated hydrochloric acid, stirred for about 25 minutes and diluted with 160 milliliters of water. The pH of the diluted solution is adjusted to a level of about 3–4 by adding the required amount of solid sodium acetate. There is an immediate precipitation of thin, dendritic flakes, which continues while allowing the solution to stand overnight, yielding 4.2 grams of the desired product. After adding an alkaline plumbite solution the test solution is blackened without heating. A positive SH-reaction occurs with sodium nitroprusside and in the presence of potassium cyanide.

(C) Preparation of inactive cystine (a) From N,N'-diacetylcystinediamide 8: 5 grams of N,N'-diacetylcystinediamide 8 are dissolved in 50 milliliters of a 20% hydrochloric acid solution and refluxed for about 3 hours. The solution is evaporated under vacuum and the residue is absorbed in 50 milliliters of water. The pH of the resulting solution is adjusted to 4.5 by adding required amounts of sodium acetate. There is an immediate precipitation of spherically shaped crystals of inactive cystine, the precipitation is completed by adding acetone and stirring overnight, yielding 3.7 grams of inactive cystine.

(b) From azlactone 5: 36.5 grams of the afore-described azlactone 5 are dissolved in 350 milliliters of a concentrated aqueous solution of ammonia. The solution is stirred ovenight and evaporated under vacuum. The residue is absorbed in 500 milliliters of a 20% hydrochloric acid solution, refluxed for 1 hour and again evaporated. The residue is absorbed in 200 milliliters of water and hydrogen peroxide is added until the SH-reaction is negative. The pH is adjusted to 4.5 grams by adding sodium acetate. Inactive cystine is precipitated in an amount of 12.8 grams of spherically shaped crystals.

DL-cysteine produced by the method of our invention, e.g. obtained from the inactive cystine prepared according to the previous examples may be further processed by benzylation and acetylation to produce DL-S-benzyl-N-acetyl cysteine. This would require reduction of the precipitated inactive cystine so as to prepare DL-cysteine as the starting material for the benzylated and acetylated product. According to a preferred embodiment of our invention this process is further simplified by making unnecessary the reduction of cystine. We have discovered that a benzylated and acetylated cysteine may be obtained by preparing the initial mixture of serine, thioacetic acid and acetic anhydride as described in Example 1–A, and feeding this solution into an aqueous solution of ammonia. During the resulting reaction, the azlactone ring is opened and the acetyl group attached to the sulfur is separated, whereas the acetyl group attached to the nitrogen remains in its attached position. The reaction product solution can be benzylated by adding benzyl chloride without prior purification, thereby obtaining DL-S-benzyl-N-acetylcysteine.

Instead of reacting the starting solution of Example 1–A with ammonia, as has just been described, a mixture of serine, thio-acetic acid, and acetic anhydride may be added to hydrochloric acid, thereby directly obtaining a solution of DL-cysteine, which then may be benzylated and acetylated in any desired sequence, i.e. benzylation may be effected first, followed by acetylation, or vice versa. In all instances an excellent yield of DL-S-benzyl-N-acetyl cysteine is obtained.

It will be apparent that our process presents a greatly simplified way of the preparation of this product from cysteine, eliminating the intermediate formation of cystine and obviating the need for the reduction of cystine to DL-cysteine. As a further advantageous feature of our invention it will be noted that the DL-cysteine and its benzylated and acetylated compound produced according to our process is a substantially pure racemate, whereas racemation of L-cysteine inevitably produces an excess of L-cysteine. The preparation of this useful product will be further described by the following examples which just as the preceding examples are not to be construed as limiting the scope, applicability and usefulness of our invention beyond the scope of our claim.

EXAMPLE 4–A 315 grams of DL-serine are suspended in 240 grams of thioacetic acid and 100 milliliters of acetic anhydride. 5 grams of pyridine are added to the suspension and within 30 minutes the temperature rises to 45° C. After heating to 75° C. the beginning exothermic reaction further raises the temperature, which is maintained at a constant 80° C. by intermittent cooling. After ½ hour complete dissolution is obtained. The solution is further agitated for 4 hours while continuously being held at 80° C. It has a honey-yellow color. Then 330 milliliters of a concentrated ammonia solution are added drop by drop and at the same time the solution is cooled and agitated. After adding 35 milliliters of benzyl chloride the solution is continuously stirred overnight. The next day the small amount of resinous by-products is decanted and the pH of the remaining solution is adjusted to pH 6 by adding the required amounts of hydrochloric acid. This solution is then evaporated under vacuum until one half of its original volume is left. During the addition of hydrochloric acid and the subsequent evaporation a few additional by-products are precipitated, which are now removed by a conventional treatment with active charcoal. The clear filtrate is adjusted to a pH of 1 by adding concentrated hydrochloric acid. The yield of 7.2 grams of DL-S-benzyl-N-acetyl cysteine is found, which is 9.5% of theoretical yield.

EXAMPLE 4–B 105 grams of DL-serine are suspended in 80 grams of thioacetic acid and 333 milliliters of acetic anhydride and 1.7 milliliters of pyridine are added. Within 30 minutes the temperature rises to 45° C. and after heating to 75° C. and during the subsequent exothermic reaction the temperature is maintained at 80° C. by intermittent cooling. Dissolution is complete after ½ hour. The solution is further agitated for about 4 hours, and has a honey-yellow color. It is evaporated under vacuum and the syrupy residue is absorbed in ½ liter of water. After adding ½ liter of concentrated hydrochloric acid the solution is refluxed for ½ hour in a nitrogen atmosphere. The resulting solution is again evaporated and the syrupy residue is again absorbed in ½ liter of water, the pH is adjusted to 8 by adding the necessary amount of 8 n-NaOH and is diluted with 800 milliliters of methanol. Then 80 milliliters of benzylchloride and 170 milliliters of 8 n-NaOH are added. After 4 hours standing at room temperature the reaction is complete as shown by a negative SH-reaction. After adjusting the pH to 5 by adding a suitable acid a yield is obtained of 132.8 grams of DL-S-benzyl-cysteine, which is 63% of theoretical, having the degree of purity fully adequate for the subsequent acetylation, next described. 155 grams of the product are dissolved in 1.1 liters of water and 100 milliliters of 8 n-NaOH and at the same time there are added 88 milliliters of acetic anhydride and sufficient 8 n-NaOH to adjust to adjust the pH to a level between 8 and 9, while intermittently cooling and stirring. After ½ hour of continuous stirring, the pH is adjusted to between 4 and 5 by adding the necessary amount of hydrochloric acid. The solution is then treated with activated carbon as previously described and is adjusted to pH 1 by adding the required amounts of HCl, yielding 159 grams or 85% of theoretical of a brown product having a melting point of 152° C., and after reprecipitation from NaOH/HCl we obtain white DL-S-benzyl-N-acetylcysteine having a melting point of 156° C.

From the foregoing examples, it will be appreciated that a preferred embodiment of the process of this invention thus contemplates to proceed by preparing a suspension of stoichiometric amounts of DL-serine in thioacetic acid and acetic anhydride, adding an amount of pyridine in the range from 0.1–0.5% by weight of the total batch, causing the temperature of said suspension to rise from room temperature to a temperature from 80–125° C., maintaining said temperature for ½ to 5 hours, oxidizing by adding one of the oxidizing agents of hydrogen peroxide, $O_2$ and air, hydrolyzing by at least one of an alkaline and acid hydrolizing agent, evaporating under vacuum so as to obtain a syrupy consistency, and reabsorbing in water in an amount of ½ to ten times the amount of water.

What we claim is:

1. A process for making DL-S-benzyl-N-acetylcysteine comprising the steps of:
 (a) reacting serine and acetic acid anhydride at 80° C. in the presence of thioacetic acid and a small amount of pyridine so as to form an adduct, and
 (b) hydrolizing said adduct with at least one hydrolizing agent selected from the group consisting of alkaline and acid hydrolizing agents thereby forming racemic cysteine,
 with the proviso that when the hydrolizing agent of step (b) is an acid hydrolizing agent benzylating and acetylating said racemic cysteine, thereby forming a solution of said DL-S-benzyl-N-acetyl-cysteine,
 when the hydrolizing agent of step (b) is an alkaline hydrolizing agent, then benzylating said racemic cysteine thereby forming a solution of said DL-S-benzyl-N-acetyl cysteine.

References Cited

UNITED STATES PATENTS 2,569,801  10/1951  Cook et al. _____ 260—516

FOREIGN PATENTS 584,736  1/1947  Great Britain _____ 260—534 S
584,774  1/1947  Great Britain _____ 260—534 S
592,631  9/1947  Great Britain _____ 260—534 S LORRAINE A. WEINBERGER, Primary Examiner J. F. TERAPANE, Assistant Examiner U.S. Cl. X.R.

260—307 B, 534 S, 561 A